United States Patent [19]

Breting et al.

[11] Patent Number: 4,730,153
[45] Date of Patent: Mar. 8, 1988

[54] PROCESS OF CHARGING AN ELECTROCHEMICAL GENERATOR HAVING ZINC NEGATIVE ELECTRODES AND AN ELECTROCHEMICAL GENERATOR FOR PUTTING THE PROCESS INTO PRACTICE

[75] Inventors: Olivier Breting, Cormeilles-en-Parisis; Bernard Bugnet, Champ sur Marne; Guy Bronoël, Versailles, all of France

[73] Assignee: Seregie, Rueil-Malmaison, France

[21] Appl. No.: 824,216

[22] Filed: Jan. 30, 1986

[30] Foreign Application Priority Data

Jan. 30, 1985 [FR] France .................................. 85 01338

[51] Int. Cl.$^4$ ................. H01M 10/44; H01M 8/18
[52] U.S. Cl. .......................................... 320/14; 320/21; 429/21; 429/15; 429/39
[58] Field of Search .............. 429/21, 27, 15, 122, 429/39, 61; 320/2-4, 21, 14

[56] References Cited

U.S. PATENT DOCUMENTS

| | | | |
|---|---|---|---|
| 3,563,800 | 2/1971 | Oswin et al. | 320/21 x |
| 3,902,916 | 9/1975 | Warszawski | 429/39 |
| 4,180,623 | 12/1979 | Adams | 429/21 |
| 4,327,157 | 4/1982 | Himy et al. | 429/61 |
| 4,517,258 | 5/1985 | Bronoel | 429/21 |

FOREIGN PATENT DOCUMENTS 1328788 9/1973 United Kingdom ............. 429/21

*Primary Examiner*—R. J. Hickey
*Attorney, Agent, or Firm*—Oblon, Fisher, Spivak, McClelland & Maier

[57] ABSTRACT

This invention relates to a process for charging a reversible electrochemical generator consisting of a plurality of cells, which are electrically in series, comprising a zinc negative electrode and a positive electrode between which a basic electrolyte, containing solubilized zinc, circulates, consisting in making the electrolyte in the cells circulate successively from one cell to the next and in applying to it a charging current forming a succession of approximately rectangular pulses. The direction of circulation of the electrolyte during charging is periodically reversed.

9 Claims, 7 Drawing Figures

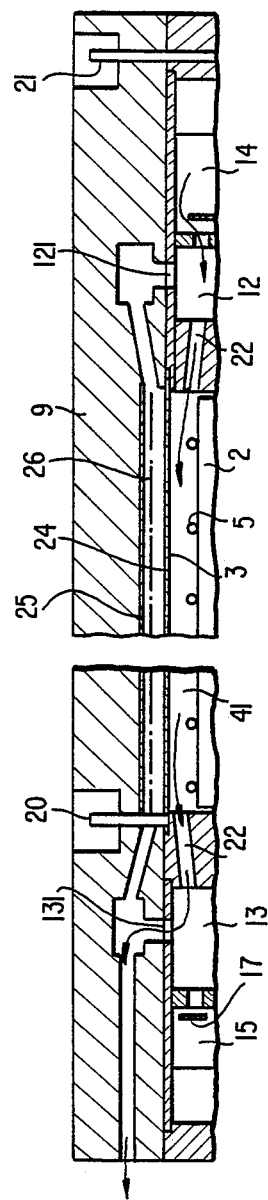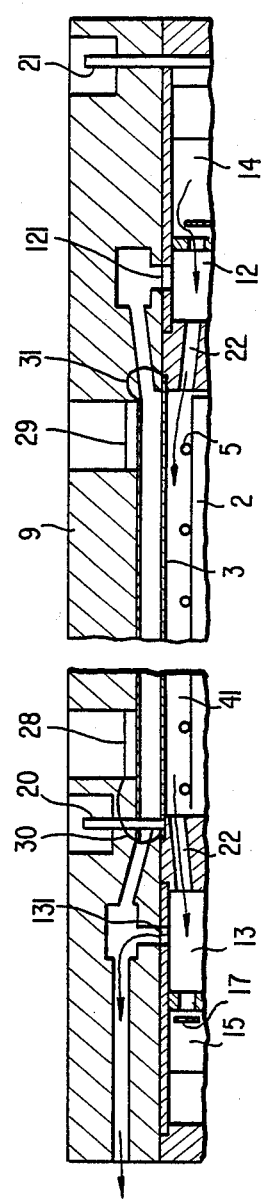

PROCESS OF CHARGING AN ELECTROCHEMICAL GENERATOR HAVING ZINC NEGATIVE ELECTRODES AND AN ELECTROCHEMICAL GENERATOR FOR PUTTING THE PROCESS INTO PRACTICE

BACKGROUND OF THE INVENTION

This invention relates, on the one hand, to a process for charging an electrochemical generator consisting of a plurality of cells, which are electrically in series, comprising a zinc negative electrode and a positive electrode between which a basic electrolyte containing solubilized zinc circulates from one cell to the next and, on the other hand, this electrochemical generator for putting said process into practice, the electrolyte being made turbulent near the negative electrode.

So far, attempts to reliably achieve a suitable zinc deposit on the zinc negative electrode during cycling of reversible batteries having a basic electrolyte using this metal have been unsuccessful. The nickel zinc battery is the best known example of such batteries. During charging of these batteries, the zinc deposit gives rise either to the formation of foams and dendrites or to irregular bulges which quickly cause short circuits between the electrodes. Until now, these defects have not made it possible to take advantage of the great specific energy of electrochemical couples using zinc.

The electrolyte is made to circulate to improve the zinc deposit. The morphology of the zinc deposit is more suitable, the greater is the speed of the electrolyte during deposit.

It was disclosed in French Pat. No. 2 056 971 to charge batteries having a zinc negative electrode by a pulse-charging current. French Pat. No. 2 097 424 proposed a charging current exhibiting discharge (anode) pulses between charging pulses.

SUMMARY OF THE INVENTION

The aim of this invention is to refine the surface of the zinc deposit and avoid deposits of dendritic zinc caused during charging on the negative, and by leakage currents going through the connecting channels between cells of multicell generators. The structure of the invention assures the dissolving of unwanted zinc deposits.

The process according to the invention consists of causing the electrolyte to circulate in series of the cells which are electrically in series and in applying to the generator a charging current forming a succession of approximately rectangular pulses. It includes the step of periodically reversing the direction of circulation of the electrolyte during charging.

The charging current preferably includes discharging pulses applied in a direction opposite to that of the charging pulse and for a time less than two-tenths of the time of the charging pulse and of an amplitude approximately equal to that of the latter, the current being approximately zero during the time between charging and discharging pulses, this zero current lasting from 3 to 10 times the time of said charging pulse.

According to a characteristic, of the invention the charging pulses have a time of 0.05 to 15 ms and the rise and fall gradients of these pulses are greater than 800 A/ms.

The generator according to the invention comprises a plurality of cells each consisting of a positive electrode and a zinc negative electrode together delimiting the electrolyte channeling passages, these cells being connected and passed through in series by the circulating electrolyte. The cells include means periodically to reverse the direction of circulation of the electrolyte after grouping the passages by halves, using blocking elements with great electrical resistance in the closed state.

According to another characteristic, the means for reversing the direction of circulation of the electrolyte comprises intake or escape cavities which come out at the ends of each passage and which communicate, under the control of blocking elements, with transfer cavities of one of the two adjacent cells, each transfer cavity communicating with an intake or escape cavity of the other adjacent cell.

BRIEF DESCRIPTION OF THE DRAWINGS

The characteristics and advantages of the invention will come out better from the following description, given solely by way of example, with reference to the accompanying drawings in which:

FIG. 6 is a diagrammatic vertical section of a variant of the generator according to the invention;

FIG. 7 shows a diagrammatic vertical section of an embodiment with air electrode, of the generator according to the invention.

DETAILED DESCRIPTION OF THE PREFERRED EMBODIMENTS

The charging process according to the invention, described below, applies to an electrochemical generator consisting of a plurality of cells comprising a zinc negative electrode and a positive electrode between which a basic electrolyte containing solubilized zinc circulates.

The charging process consists of applying to the terminals of the generator the particular pulse charging current. During charging, the electrolyte circulates so that the movement is turbulent on the negative electrode where the zinc is deposited.

Figure 1:
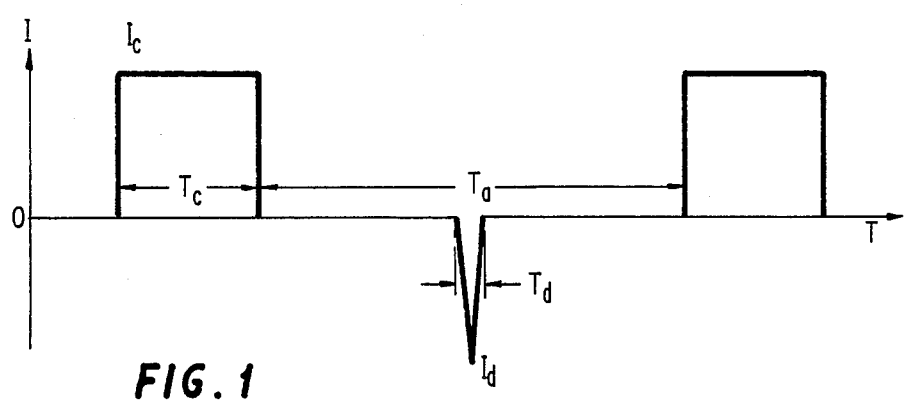
FIG. 1 is a graph giving charging current I of the generator as function of time T.
Figure 2:
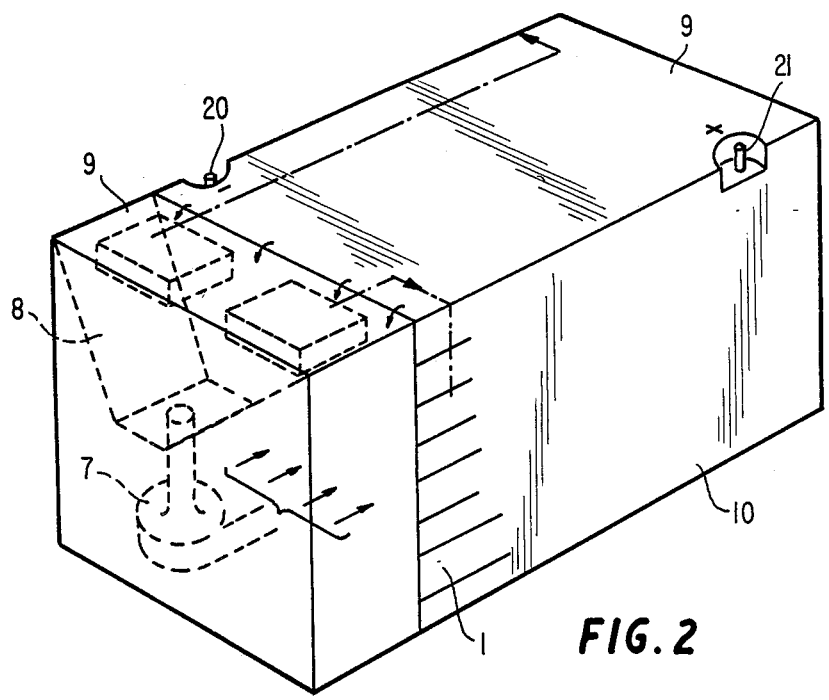
FIG. 2 is an overall view of a multicell generator according to the invention.
Figure 3:
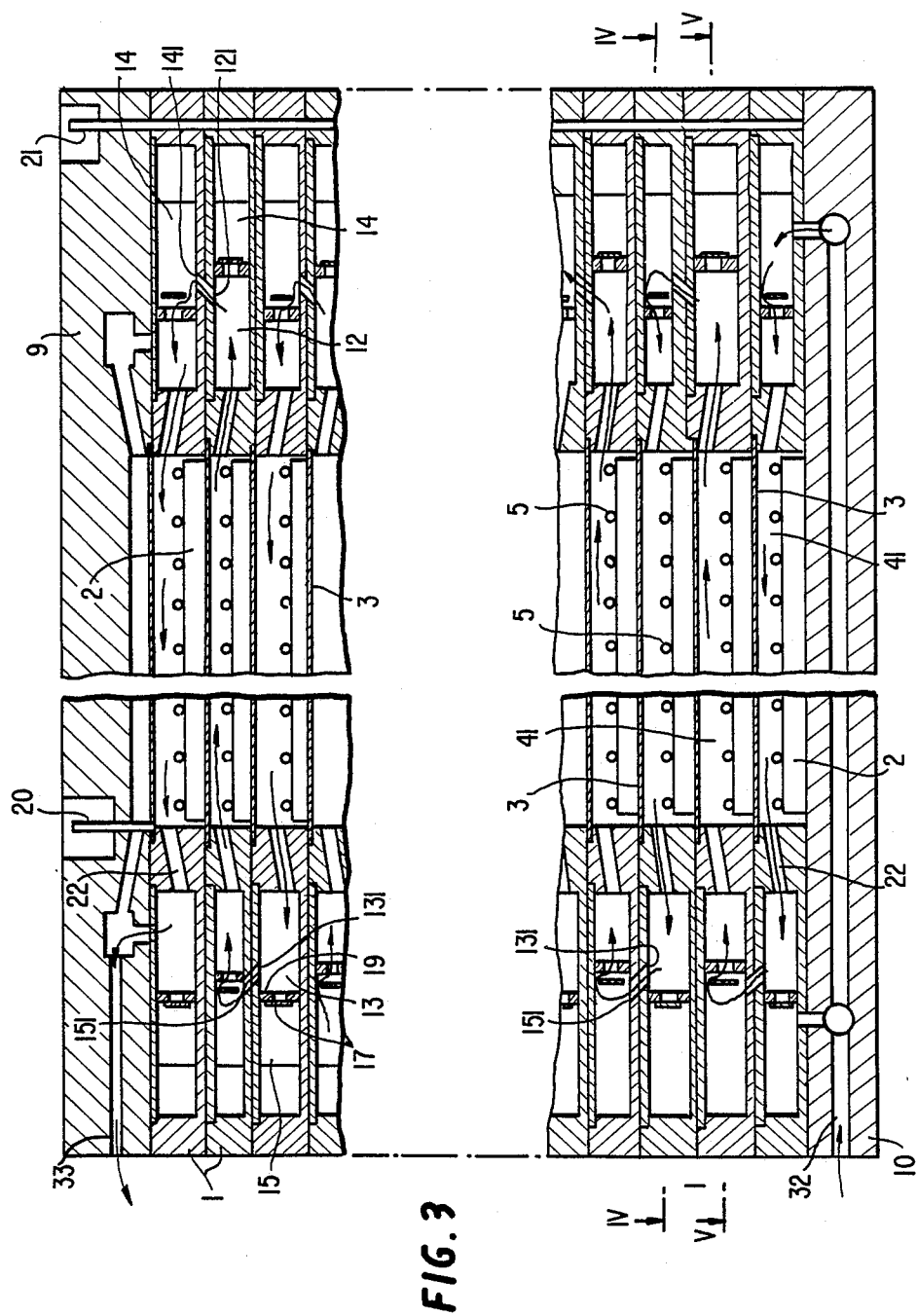
FIG. 3 is a vertical section in partial section of an embodiment of a multicell generator of FIG. 2.

With reference to FIG. 1, the charging current is characterized by a succession of charging pulses $I_c$ so that two successive pulses are separated by a time interval $T_a$. Period $T_c$ of a charging pulse is between 0.05 and 15 m.sec (preferably 2.5 m.sec). The intended surface of the negative collector is subjected to a charge of 6 to 15 $A/dm^2$, preferably 8 to 12 $A/dm^2$. The current rise and fall gradients of these pulses are greater than 800 A/ms.

Time interval $T_a$ between two charging pulses is at least equal to 3 times time $T_c$ of a charging pulse.

Between charging pulses the charging current includes short discharging pulses $I_d$ (anode pulses) which have an amplitude approximately equal to that of the charging pulses. Each anode pulse $I_d$ has a time $T_d$ of 0.05 to 0.2 times time $T_c$ of charging pulse $I_c$, to keep a reasonable charging efficiency.

Discharging pulses $I_d$ are separated by at least one charging pulse.

A characteristic of the process consists of periodically reversing the direction of circulation of the electrolyte. This reversal occurs every 3 to 60 minutes.

Referring to the drawings, the generator according to the invention comprises a stack of plastic frames 1 mounted between a base 10 and a cover 9. Base 10 is intended to allow seating of the generator on any support as well as service of the various guide passages of the electrolyte. Cover 9 serves for protection and can contain terminals 20 and 21 as well as electrolyte returns and accessory components which will be discussed below.

Frames 1 are preferably made of plastic and serve to house the components of the elementary cells.

Each elementary cell comprises a positive electrode 2 (which can be a nickel electrode or a reversible air electrode, or any another suitable electrode). By way of indication, this electrode can consist of a nickel felt containing active material.

This positive electrode 2 is associated with a bipolar plate 3 called a collector made of conductive material. This plate 3 permits placing the various cells in series and carries the conductive zinc deposit which is formed during charging. It is fixed to adjacent electrode 2 by a suitable fastening system.

Each positive electrode 2 is separated from a bipolar collector 3 by a space so as to define a channel through which the electrolyte circulates, along passages 41 delimited by bars 6 also spacing the electrodes and collectors.

In the embodiment described and shown, collectors 3 are flat and horizontal. The frames that receive electrodes 2 and 3 have ducts 22 at their ends for connecting with passages 41. Passages 41 are connected from one cell to the next by cavities 12, 13, 14, 15 grouping ducts 22 alternately from one cell to the next so that the electrolyte flow common to a multicell generator has, in the latter, a zig-zag path under the action of a pump 7.

The basic electrolyte has a potassium hydroxide base, 7 to 9 times normal (preferably 8 times normal) and contains 2 to 3% alkaline silicates and optionally known additives such as depassivators and/or corrosion inhibitors. The zinc in the oxidized state is entirely solubilized.

The electrolyte circulates in passages 41 during charging and discharging. A buffer tank 8 makes possible feeding of pump 7 for circulating electrolyte. It can advantageously receive the part of the electrolyte driven from the generator at the moment of overload which ends the charging, by the creation of gas which results therefrom, hydrogen at the negative, oxygen at the positive. It will be noted that the electrolytic circuit existing between output and input of the battery, a circuit including the tank and pump or pumps, should exhibit such a resistance that under the total voltage of the battery the leakage current is reduced to less than 1% of the rated current already defined.

The average speed of circulation of the electrolyte can amount to 0.1 to 0.5 m/s. The thickness of meshing 5 placed on the positive and turbulence generator can be spread between 0.3 and 2 mm, and is preferably on the order of 1 mm, the meshes have dimensions of 3 to 10 mm, the passages having a thickness going from 2 to 4 mm.

During charging of the generator, the zinc dissolved in the electrolyte is deposited on collectors 3.

With reference to FIGS. 2 to 5, the generator includes vertical bars 6 which partition the channel into several passages 41. Collectors 3 and positive electrodes 2 are held by frames 1.

Each collector 3 is made from steel sheet having a thickness of 0.05 to 0.4 mm exhibiting on one side a nickel-plated face against the positive electrode and on the other side a cadmium-plated face on which the zinc is deposited.

Each cell has a meshed network or lattice 5 of threads of insulating material. It is deposited on the surface against positive electrode 2. It faces a collector 3 attached to a positive electrode, being separated from this collector by channels 4. By way of example, an effective meshing comprises strands of 0.3 to 2 mm, the meshes measuring from 3 to 10 mm. The function of this meshing is to generate turbulences close to the negative electrode.

Preferably each collector 3 is mounted under positive electrode 2 to which it is connected.

Each passage 41 comes out at its ends into two groups of two cavities 12 and 14 or 13 and 15. Each cavity 12 or 13 communicates with a transfer cavity 14 or 15, the passage of the electrolyte from one of the cavities to the next being controlled by blocking elements each comprising a clack valve or valve 16 or 17 which have great flow resistance in their closed state.

Figure 4:
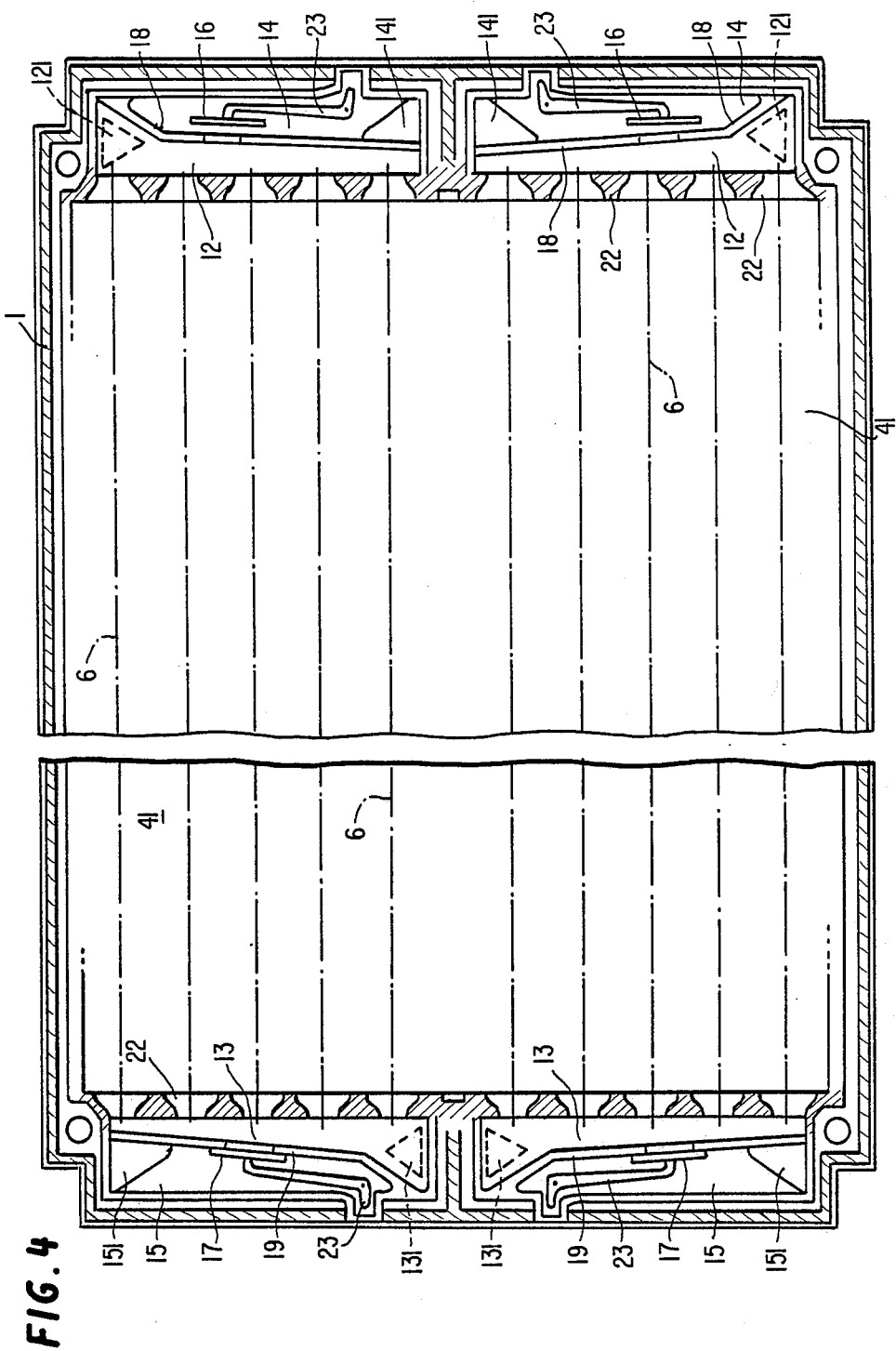
FIG. 4 is a horizontal section along IV—IV of FIG. 3.
Figure 5:
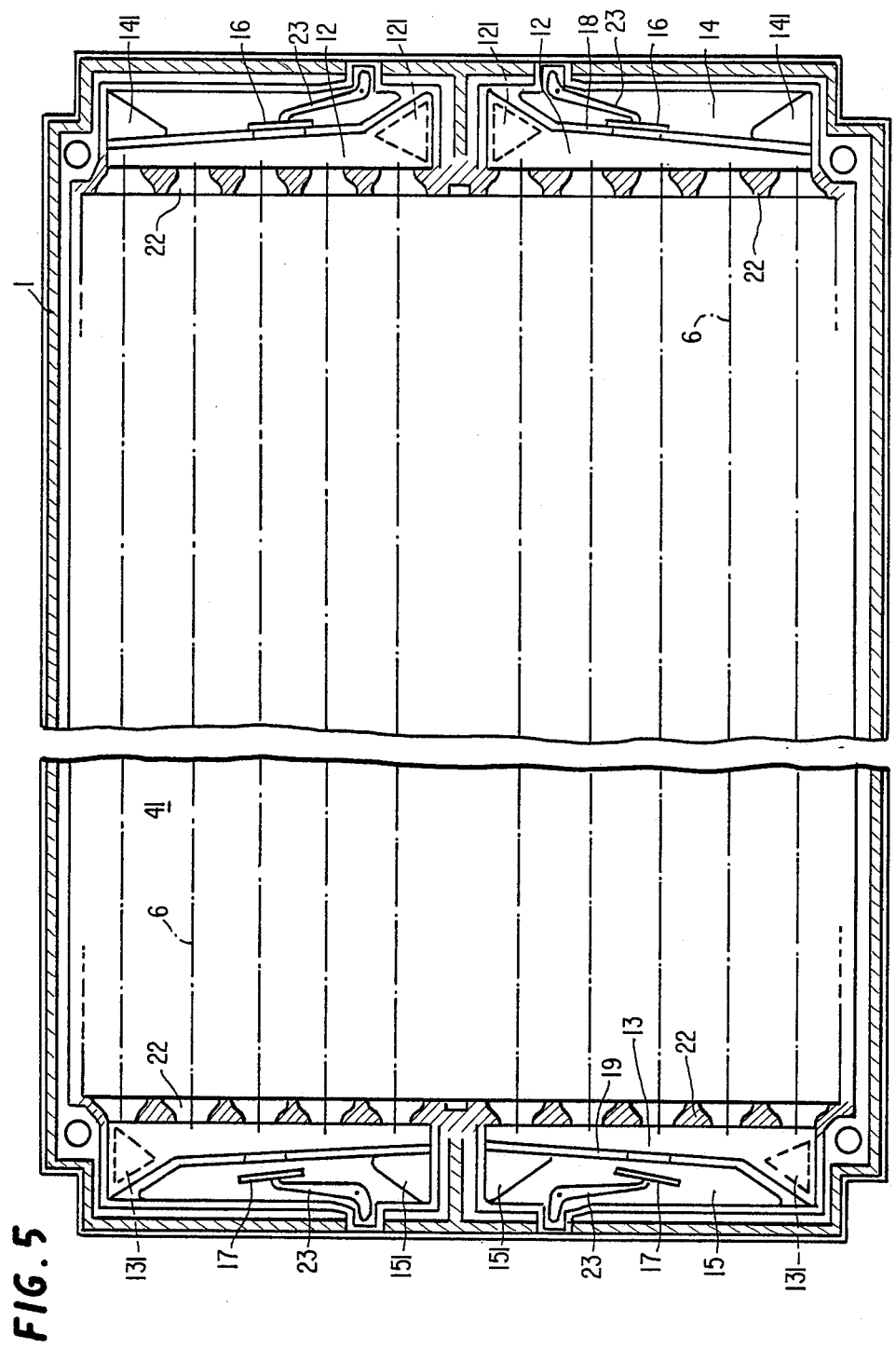
FIG. 5 is a horizontal section along V—V of FIG. 3.

Cavities 12, 13, 14, 15 are housed in frames 1. They are separated by partitions 18 or 19 forming valve seats and placed diagonally. Each cavity 12 or 13 communicates by an orifice 121 or 131 with the transfer cavity of the cell thereabove (FIG. 4). Each transfer cavity 14 or 15 communicates by an orifice 141 or 151 with the intake or escape cavity of the cell therebelow (FIGS. 4 and 5).

The electrolyte coming from the pump 7 goes into the lower cell by channel 32. It comes out from the upper cell by channel 33 to go into the tank.

Cavities 12 and 13 diagonally opposite on the generator are such that channel 121 of the one, by 180° rotation, covers channel 151 close to the other. Thus, two frames, turned 180° and superposed, assure the continuity of the electrolyte circulation. The diagonal shape of partitions 18 and 19, together with the lateral arrangement of connecting channels 121, 131, 141 and 151, allow only this coincidence.

In the same way, circulation in only one direction results, for example, from open clack valve 16 and closed clack valve 17, and conversely for contiguous cells.

Reversal of all the arrangements of the clack valves reverses the direction of circulation.

The diagrammatic control of the clack valves by levers 23, which themselves are controlled by screws inside frame 2 and not shown can be seen in FIGS. 4 and 5.

Thus, when the electrolyte coming from a lower cell (FIG. 5) arrives by orifice 141 into cavity of an upper cell (FIG. 4) serving for intake, clack valve 16 of the upper cell is open. The electrolyte is collected by cavity 12 serving for escape. With clack valve 16 open, the electrolyte goes to intake cavity 13 via passages 41 of the cell and through ducts 22. During this alternation the communication between cavity 13 and cavity 15 of the upper cell is closed by clack valve 17 of said cell and so the electrolyte goes through orifice 151 to cavity 15 thereabove.

Control of the reversal of the opening and closing of valves 16 and 17 reverses the circulation of electrolyte.

Cavity 12 then serves for intake and cavity 13 serves for escape.

Cavities 12 and 14 are separated by a partition 18 extending diagonally, and cavities 13 and 15 are separated by a partition 19 extending diagonally. Partitions 18 and 19 of the same cell are diagonally opposite. Partitions 18 and 19 located on the same side and belonging to two superposed adjacent cells are crossed so that each intake or escape cavity communicates with a transfer cavity of the adjacent cell.

Each frame 1 contains four intake or escape cavities 12 and 13 and four transfer cavities 14 and 15.

In the embodiment of FIG. 6, the generator includes an additional positive electrode 24 which is associated with last negative electrode 3. It is outside the electric circuit of the main battery and is charged by a means outside the one providing the main charging of the generator.

To do this, this electrode 24 is associated with a counterelectrode 25 confined in an electrolyte solution without zinc by a semipermeable membrane 26 impervious to zinc-base ions.

Because of the danger of failure of the semipermeable wall which would lead to an unwanted zinc deposit on 25, the additional positive electrode can be replaced by two air electrodes 28 and 29 located close to the ends of the last negative and electrically connected to this latter by conductors 30 and 31, the capacitance of these electrodes being such that they dissolve the lateral unwanted deposits on 3 due to the charging currents coming from the positives of greater voltage through channels 22 (FIG. 7) in channel 4.

Functioning of the generator will now be described.

Alternation of the direction of circulation of the electrolyte leads to regular elimination of the marginal zinc deposits arising from charging a negative by positives of higher voltage through the connecting channels from one cell to the next, the corresponding currents being called leakage currents.

It is clear that on an elementary cell, a connecting channel 22, open toward the cells of higher voltages through cavities 12, 13, 14, 15 and one of clack valves 16 or 17, allows an unwanted charging current due to said cells, which is reflected by a lateral dendritic unwanted deposit at electrode 3.

The other end 3 is then electrochemically connected to positive 2 associated with 3, causing a short-circuit current because 2 and 3 are in solid short circuit in the same electrolyte.

Consequently, there is a lateral dissolving of the zinc commensurate with this current and the time.

Alternation of the direction of flow of the electrolyte causes the zinc deposits by the leakage currents in charging to be compensated by permanent short-circuit currents.

Also a good proportion of charging and idle times during this charging, and considering the effect of the electrochemical resistance of the connecting channels of the electrolyte from one cell to the next, makes it possible to eliminate all unwanted deposits linked to the leakage currents during charging.

Only the top negative 3, which has no associated positive 2, requires an additional remedy. This consists in providing this end negative with an added positive 24 (FIG. 6) charged independently of the generator itself. It acts like the other positives, at the cost of switching the direction of the electrolyte. Charging of this positive forms a counterelectrode 25 which would run the risk of taking useful zinc. Also it should be protected by a semipermeable wall 26 blocking the zinc ions.

Since this semipermeable wall 26 runs the risk of dangerous failure, it can be replaced by two air electrodes 28 and 29 (FIG. 7) electrically connected to 3 by wires 30 and 31 and located near the ends of end negative 3.

It goes without saying that these compensations can exist only if the blocked channels offer a sufficient electrical resistance, which only the valve blockings (>150 Ω) provide.

Of course, the invention is not limited to the embodiments described and shown and it is amenable to numerous variants accessible to a man of the art without going outside the spirit of the invention.

The orientation of the collectors in space is immaterial.

Finally, the means described in the invention can be used for other types of batteries.

Alternation of the direction of circulation of the electrolyte can be used both during discharging and during charging.

We claim:

1. Process for charging a reversible electrochemical generator including of a plurality of cells which are electrically in series, each of said cells comprising a zinc negative electrode and a positive electrode between which circulates a basic electrolyte containing solubilized zinc, said process comprising the steps of: causing the electrolyte in the cells to circulate successively from one cell to the next, applying to said electrodes a charging current forming a succession of approximately rectangular charging pulses, and periodically reversing the direction of circulation of the electrolyte during said charging step.

2. Charging process according to claim 1, wherein the charging current also comprises discharging pulses having a direction opposite to that of the charging pulses and being applied between charging pulses, said discharging pulses being applied for a time less than two-tenths of the charging time of the charging pulses and having an amplitude approximately equal to that of the charging pulses, the current being approximately zero during times between said charging and discharging pulses.

3. Process according to claim 1 or 2, wherein the charging pulses have a time of 0.05 to 15 ms and the rise and fall gradients of the charging pulses are greater than 800 A/ms.

4. Process according to claim 2, wherein the discharging pulses are separated by at least two charging pulses.

5. Electrochemical generator comprising a plurality of cells each including a positive electrode and a zinc negative electrode which together delimit electrolyte channeling passages, said cells being connected such that circulating electrolyte can pass through said cells in series, and means for periodically reversing the direction of circulation of the electrolyte, said reversing means including blocking elements having great flow resistance in the closed state.

6. Generator according to claim 5, wherein said reversing means further comprise intake and escape cavities connected at ends of said passages and transfer cavities communicating with said intake and escape cavities via said blocking elements, each said intake or escape cavity of one of said cells also communicating with a transfer cavity of one of two adjacent cells, each transfer cavity of said one of said cells communicating with an intake or escape cavity of the other of said two adjacent cells.

7. Generator according to claim 5 or 6, including an additional positive electrode associated with a counter-electrode having a semipermeable membrane.

8. Generator according to claim 5 or 6, including two air electrodes electrically connected to a last negative electrode in series.

9. Generator according to claim 5 or 6, wherein the positive electrode comprises a meshed network of insulating threads with a strand diameter of 0.3 to 2 mm and meshes of 3 to 10 mm, said passages having a thickness of from 2 to 4 mm.

* * * * *